US009852092B2

United States Patent
Leijten

(10) Patent No.: US 9,852,092 B2
(45) Date of Patent: Dec. 26, 2017

(54) SYSTEM AND METHOD FOR MEMORY ACCESS

(71) Applicant: Intel Corporation, Santa Clara, CA (US)

(72) Inventor: Jeroen Leijten, Hulsel (NL)

(73) Assignee: Intel Corporation, Santa Clara, CA (US)

( * ) Notice: Subject to any disclaimer, the term of this patent is extended or adjusted under 35 U.S.C. 154(b) by 746 days.

(21) Appl. No.: 14/228,475

(22) Filed: Mar. 28, 2014

(65) Prior Publication Data

US 2015/0278132 A1 Oct. 1, 2015

(51) Int. Cl.
| | |
|---|---|
| *G06F 13/28* | (2006.01) |
| *G09G 5/39* | (2006.01) |
| *G06F 9/48* | (2006.01) |
| *G06F 9/50* | (2006.01) |
| G09G 5/393 | (2006.01) |
| G09G 5/395 | (2006.01) |

(52) U.S. Cl.
CPC ............ *G06F 13/28* (2013.01); *G06F 9/4843* (2013.01); *G06F 9/5016* (2013.01); *G09G 5/39* (2013.01); *G06F 2209/482* (2013.01); *G06F 2209/5016* (2013.01); *G09G 5/393* (2013.01); *G09G 5/395* (2013.01); *G09G 2360/127* (2013.01)

(58) Field of Classification Search
CPC .................................. G06F 13/28; G09G 5/39
See application file for complete search history.

(56) References Cited

U.S. PATENT DOCUMENTS

| | | | | |
|---|---|---|---|---|
| 6,597,812 B1* | 7/2003 | Fallon | ................. | H03M 7/3088 341/51 |
| 2007/0008323 A1* | 1/2007 | Zhou | .................... | H04N 19/433 345/475 |

* cited by examiner

*Primary Examiner* — Zachary K Huson
(74) *Attorney, Agent, or Firm* — Compass IP Law PC

(57) ABSTRACT

A memory controller performs DMA operations on arbitrary sized elements unbounded by the word size of the host memory or processor, which performs operations based on an element that represents an atomic data unit such as a pixel. In this manner, a corresponding coding effort is not concerned with computing and locating word boundaries and accommodating unused bits of data conventionally used for accommodating word boundaries on pixel data for video rendering, for example. An element in memory corresponds to a rendered atomic data item, such as a pixel. The controller determines an element precision indicative of a size of the element, and identifies a unit of memory based on a memory location and a packed representation of a plurality of the elements relative to the memory location. The unit has a height and width, defining elements arranged in a grid, and an element position is based on coordinates.

20 Claims, 9 Drawing Sheets

Fig. 3

SYSTEM AND METHOD FOR MEMORY ACCESS

BACKGROUND

Many imaging and video algorithms and applications benefit from processing pixels out of local memory. This enables moving data around the system in parallel to computing on data. The dedicated blocks performing data communication are commonly known as Direct Memory Access (DMA) devices. DMA relieves the host processor from burdensome, repetitive memory operations that do not need processor support due to the relatively small number of instructions that need to be supported (typically "move" operations). In rendered video operations, DMA efficiently maintains memory representation by moving voluminous memory structures representing rendered on-screen objects by repetitively referencing atomic memory units that represent an individual rendered pixel. Traffic to and from such local memory is typically predictable and hence highly suitable for support by Direct Memory Access (DMA). To deal with specific sensor pixel precision as well as save on memory bandwidth and size, different pixel precisions are used inside a typical imaging/video hardware platform. Such atomic memory units may not necessarily correspond to the word size of the platform.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
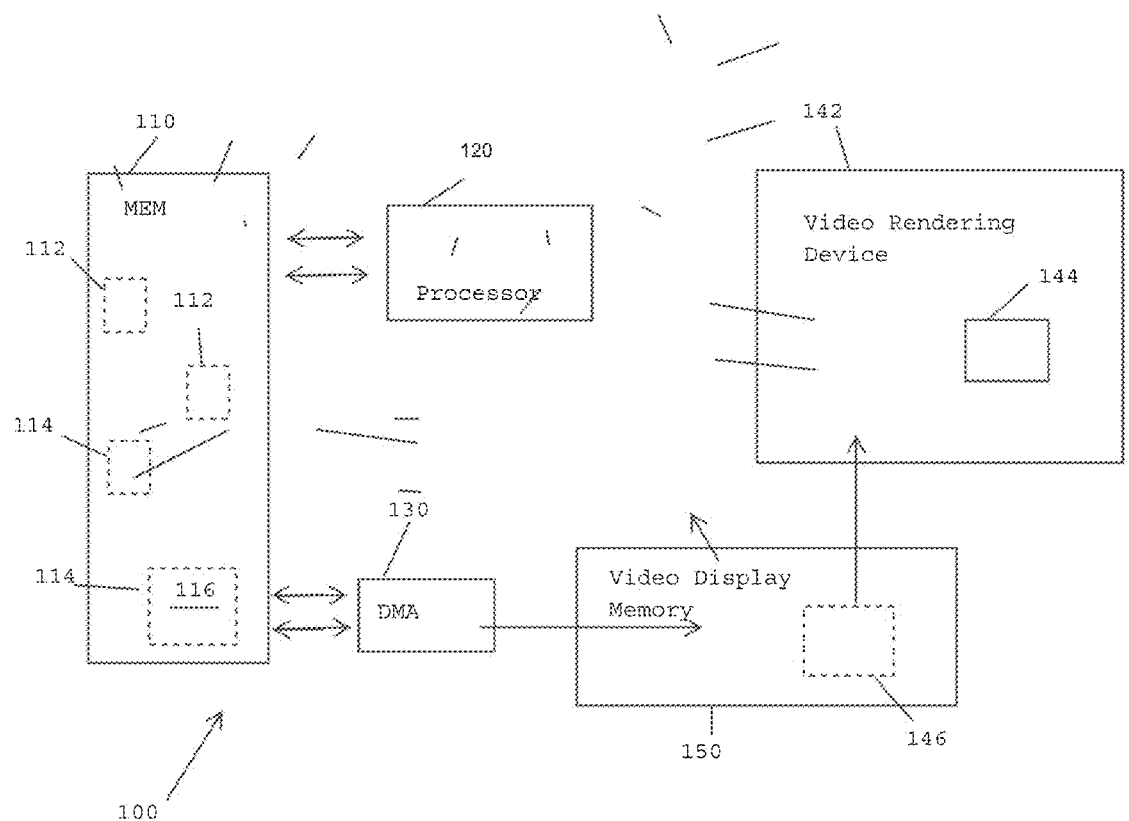
FIG. 1 is a context diagram of a computing device suitable for use with configurations herein.

A computing device typically employs a processor and memory of a particular word size, representative of the number of bits that the processor can operate on. All instructions performed by the processor occupy the word size, including opcodes and operands, having specifically defined bit positions as prescribed by the instruction set of the processor. Similarly, the memory is typically of a corresponding word size, meaning the size of a data item fetched or stored into memory. Traditionally, word sizes are powers of 2, and almost always a multiple of 8 bits. Therefore, processor evolution has exhibited word sizes of 8, 16, 32 and 64 bits. Since the processor and memory operate most efficiently on a word sized data item, operands are sometimes manipulated to pad or truncate them to meet the word size. Similarly, memory accesses and opcode (instruction) references are sometimes required to be word or byte aligned, meaning that an operand must begin at a word size multiple in memory, i.e. at 4 byte offsets in a 32 bit machine. In other words, computing operations that seek other than a word-sized operand often incur overhead to meet word alignment requirements of the host processor. However, some operations are constrained by such a word boundary requirement. For example, video memory, representing on-screen rendered data, may have a pixel representation of 10 bits per pixel, or other non-byte multiple. Operations that require 8 or 16 bit (1 or 2 byte) memory references tend to "waste" bits. DMA access as disclosed below mitigates this shortcoming.

In configurations discussed below, a DMA transfers data at the level of (2D) blocks, characterized by a width, height and stride of the 2D block as well as a start address of the block at source and destination. In conventional approaches, the DMA block width is typically programmed in terms of bytes. When element precision is different at source and destination, block widths at source and destination will differ as well, which increases control overhead. Moreover, when faced with arbitrary precision (i.e. elements are not powers of 2 in bytes), determining the block width in bytes involves complex calculations and typically leads to a varying number of data words being read from the source and written at the destination. Also, address calculation at source and destination becomes highly complex and typically highly constrained as elements will not reside at byte-aligned addresses. Such constraints complicate DMA programming which typically increases firmware/software complexity.

When a DMA is programmed on the basis of block widths expressed in elements, the block width will be the same at source and destination, independent of the precision of elements at source and destination. Under the constraint that multiple elements are packed in data words, the position of an element in a word can be expressed by the combination of a word-aligned address and an element offset (referred to as left margin) within the data word. Any translation to final byte addresses and alignment is resolved by the DMA hardware and not visible to the programmer/coder, greatly simplifying DMA programming and reducing control overhead.

Configurations herein are based, in part, on the observation that modern computing systems employ a number of memory operations that are highly repetitive, such as for video display rendering. Conventional approaches to video display memory employed the host processor for manipulating video memory, in addition to the main computing tasks that the host processor performed. The advent of DMA relieved the host processor from this burden, by bypassing certain routine memory operations around the processor via DMA blocks. However, DMA access continued to require substantial coding and instruction sequences for address arithmetic to store data, such as graphical pixel information, in the proper locations. Accordingly, configurations herein substantially overcome the coding and instruction sequences associated with DMA access by performing DMA operations on arbitrary sized elements unbounded by the word size of the host memory or processor, which performs operations such as a move based on an element, representing an atomic data unit such as a pixel. In this manner, the coding effort is not concerned with computing and locating word boundaries and accommodating unused bits of data conventionally added for accommodating word boundaries on pixel data for video rendering, for example.

FIG. 1 is a context diagram of a computing device suitable for use with configurations herein. Referring to FIG. 1, in an example computer system 100, a processor 120 is coupled to a memory 110 that stores programs 112 and data 114 for instructions executed by the processor. A DMA controller 130 (DMA) also operates on the data 114 for transferring the data 114 directly to a destination device, such as a video display memory 150, for rendering on a video rendering device 141 or screen. The data 114 may represent a unit of renderable pixel data, for example, that the DMA controller 130 transfers to a destination 146 for rendering (display) on the video rendering screen 141. In various configurations, the destination may correspond to an image capture based on a video signal or other suitable image or visual data. For example, image/video data while being processed has to be moved between memory (buffers). And hence, such buffers can be either the source or destination of the transfer. In case of image/video capture the original source of the data being moved/processed is typically an image sensor. In video/graphics display the final destination could be a display buffer. A source unit 116 typically has a structure that lends itself well to the destination, such as a pixelated representation of an on-screen image 144 or other renderable form, such as an entire screen area. The DMA controller 130 performs various operations such as data moves on the data 114, often for supporting operations such as video display rendering, as discussed further below. In the configurations herein, either the source or destination may correspond to data originating or resulting in an image/video capture.

Figure 2:
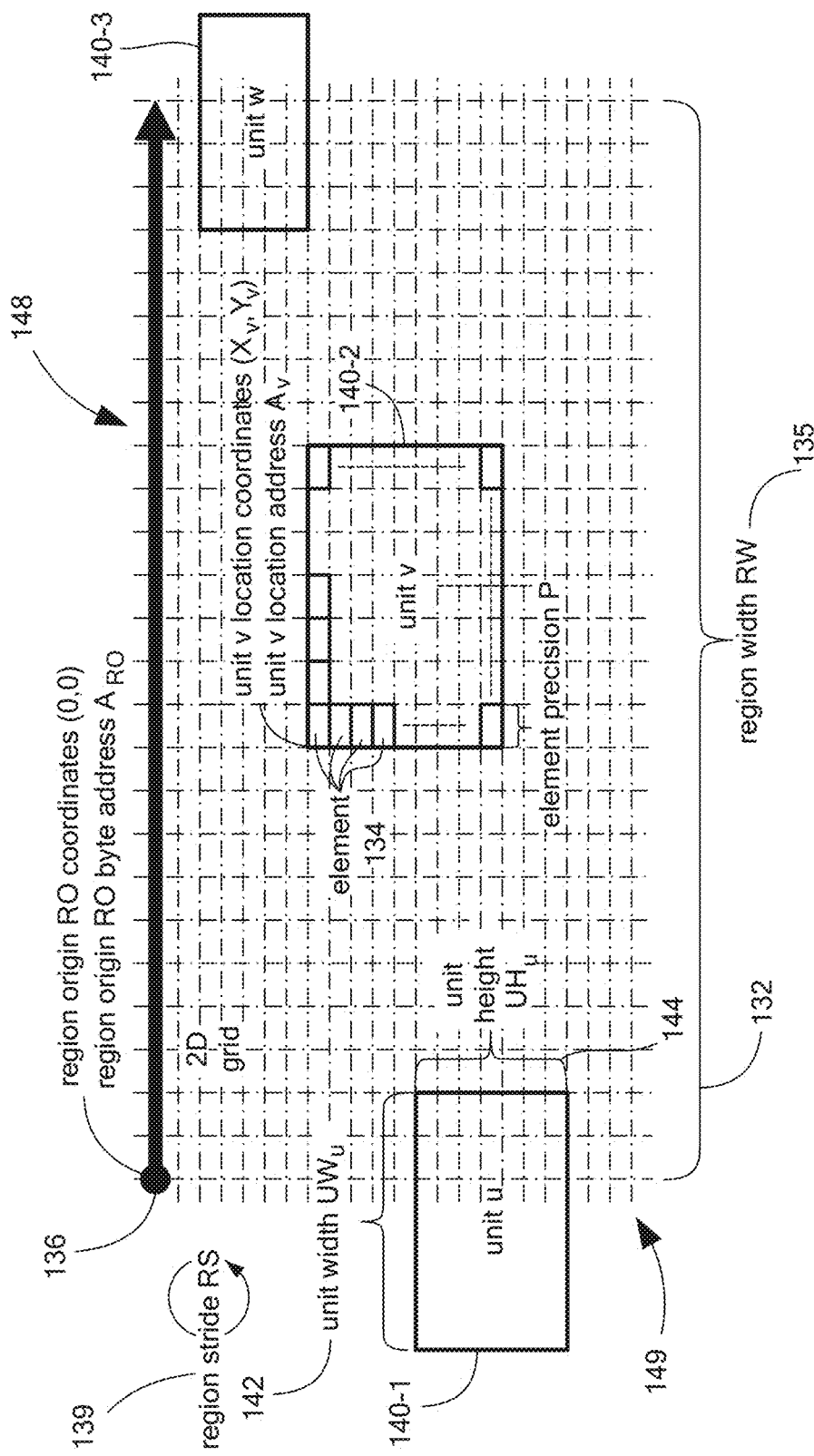
FIG. 2 is a diagram of a memory region in the environment of FIG. 1.

FIG. 2 is a diagram of a memory region in the environment of FIG. 1. Referring to FIGS. 1 and 2, the data 114 occupies a region 132 of the memory 110. When moving or initializing data 114, the DMA controller 130 (DMA) operates on groups of so-called elements 134. An element 134 is defined as the atomic representation of data being moved or initialized. Typically, the definition of an element is associated with the type of data being moved. For instance, when moving or initializing image or video data, an element is typically defined to represent a single pixel on the video rendering screen 141. When moving binary program code, an element could for instance be defined to represent a single byte. Alternate arrangements may define the unit to be any suitable precision (bit size) appropriate to the task. It should be noted that the methods and operations disclosed herein are applicable to any suitable size (bits) of element, without regard to the word size or word boundaries that tend to become problematic in conventional approaches.

Figure 8A:
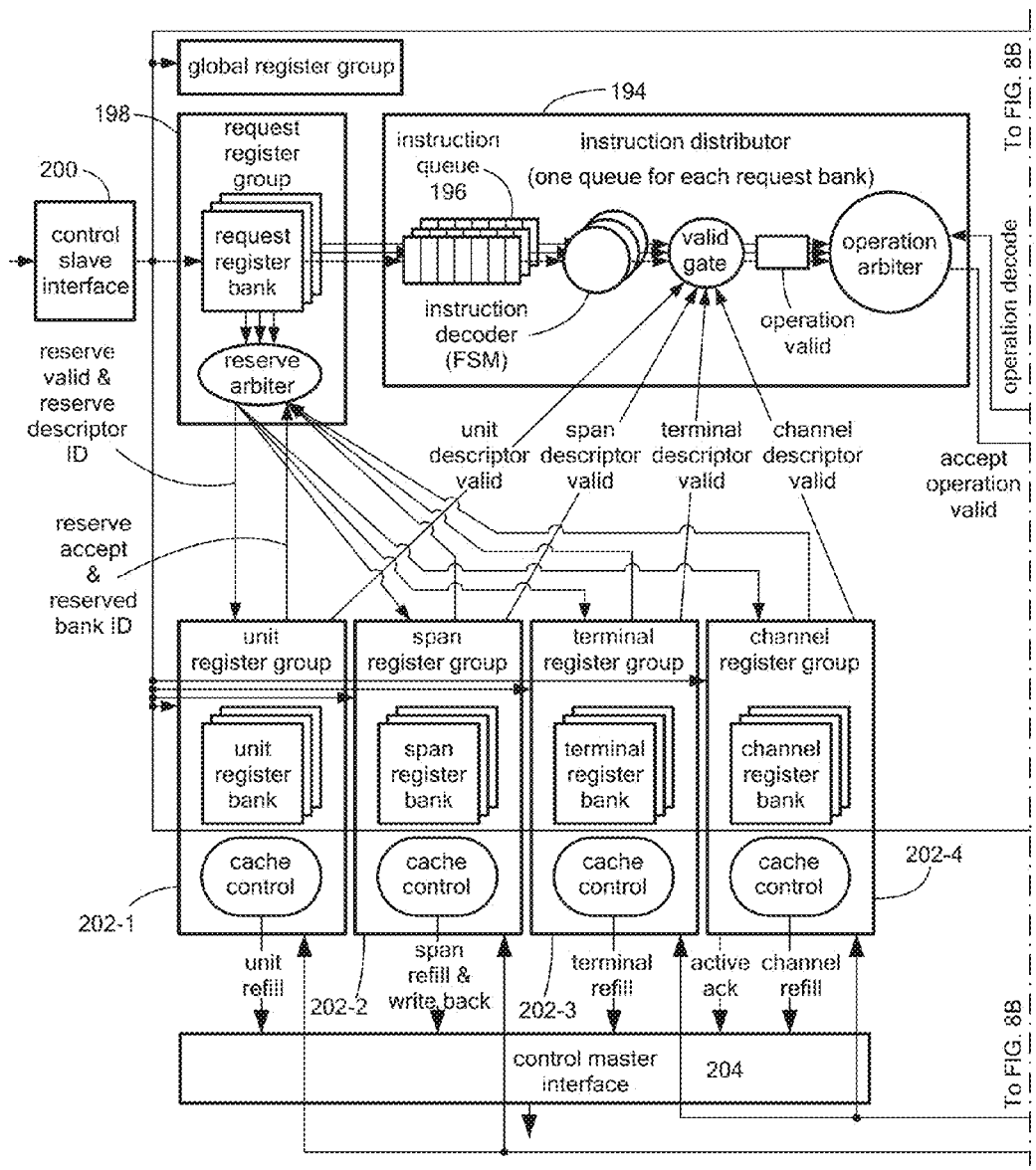
FIGS. 8A and 8B are an architecture diagram of the DMA controller of FIG. 1.
Figure 8B:
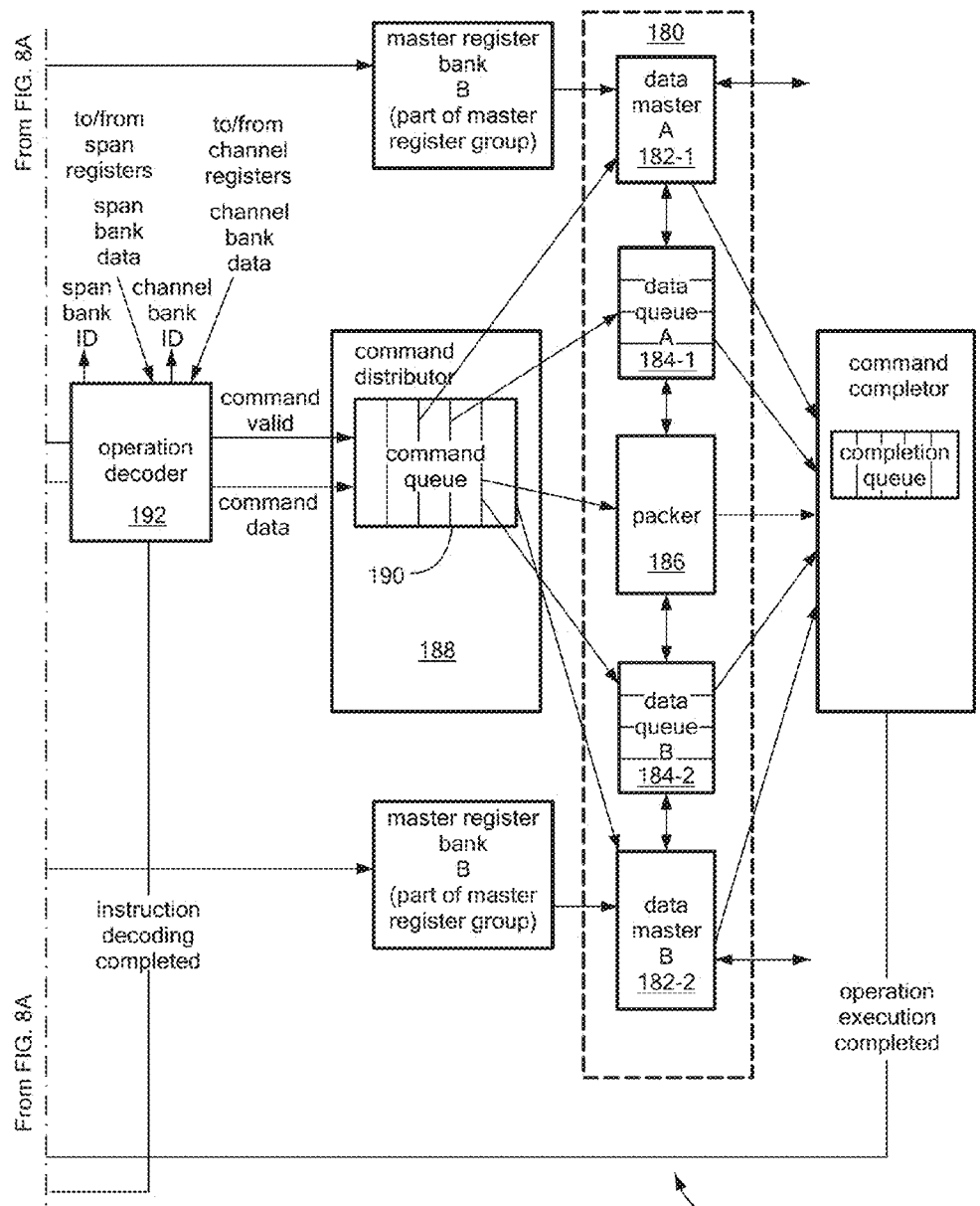

An element 134 is characterized by an element precision, specified in bits. The DMA 130 supports any element precision, that is, any number of bits per element 134, as long as the element 134 is smaller than the data word width of both DMA data master ports (FIGS. 8A and 8B, below).

The groups of data elements of a given precision being operated on by the DMA 130 are referred to as units 140-1, 140-2, 140-3 (140, generally). Units 140 represent two dimensional blocks of elements 134 characterized by a width 142 in number of elements and a height 144 in number of elements, laid out along a 2-dimensional grid defining the region 132. A region, in turn, is characterized by a region origin 136 represented by a memory mapped byte address indicating the top-left corner of the region, a region width 135 in number of elements and a region stride 139 in number of addressable bytes. Using the coordinate-based addressing, the location of each individual element relative to the region origin can be expressed by means of (x,y) coordinates. As shown visually in FIG. 2, the stride 139 can represent a column 148 that repeats each stride to define the column elements in successive rows, each row having a stride's worth of data.

Since the elements 134 are of a similar but arbitrary sized number of bits, element boundaries may fall between byte and word boundaries. Further, the elements 134 are stored in a packed representation, such that an element starts on the succeeding bit from its predecessor, up to the number of elements that may fit within a word. In a particular configuration as disclosed, the element does not cross word boundaries, and may be padded or buffered out to the next word boundary after a maximum packed number of elements are stored within the word. Note that the elements 134 of the units 140 and the addressable bytes of the region 132 differ in size, although the origin 136 is byte or word aligned.

As will be discussed further below, for the source unit 116 from where a data transfer is taking place (i.e. the reading side), the region origin 136, width 132 and stride 139 are all relevant. For the destination 146 to where a data transfer takes place (i.e. the writing side), the region origin 136 and stride 139 are relevant, but the region width is irrelevant, since the destination 146 takes the unit width from the source unit 116. The region origins and strides can be defined differently at source and destination. Moreover, the element precision can be defined differently at source and destination and hence element conversion may occur between source 116 and destination 146. However, given that a unit can be visualized and defined as a 2 dimensional (2D) block of elements 134 moved from the source 116 to the destination 146, the width and height of a unit 140 is typically the same at source and destination.

Figure 3:
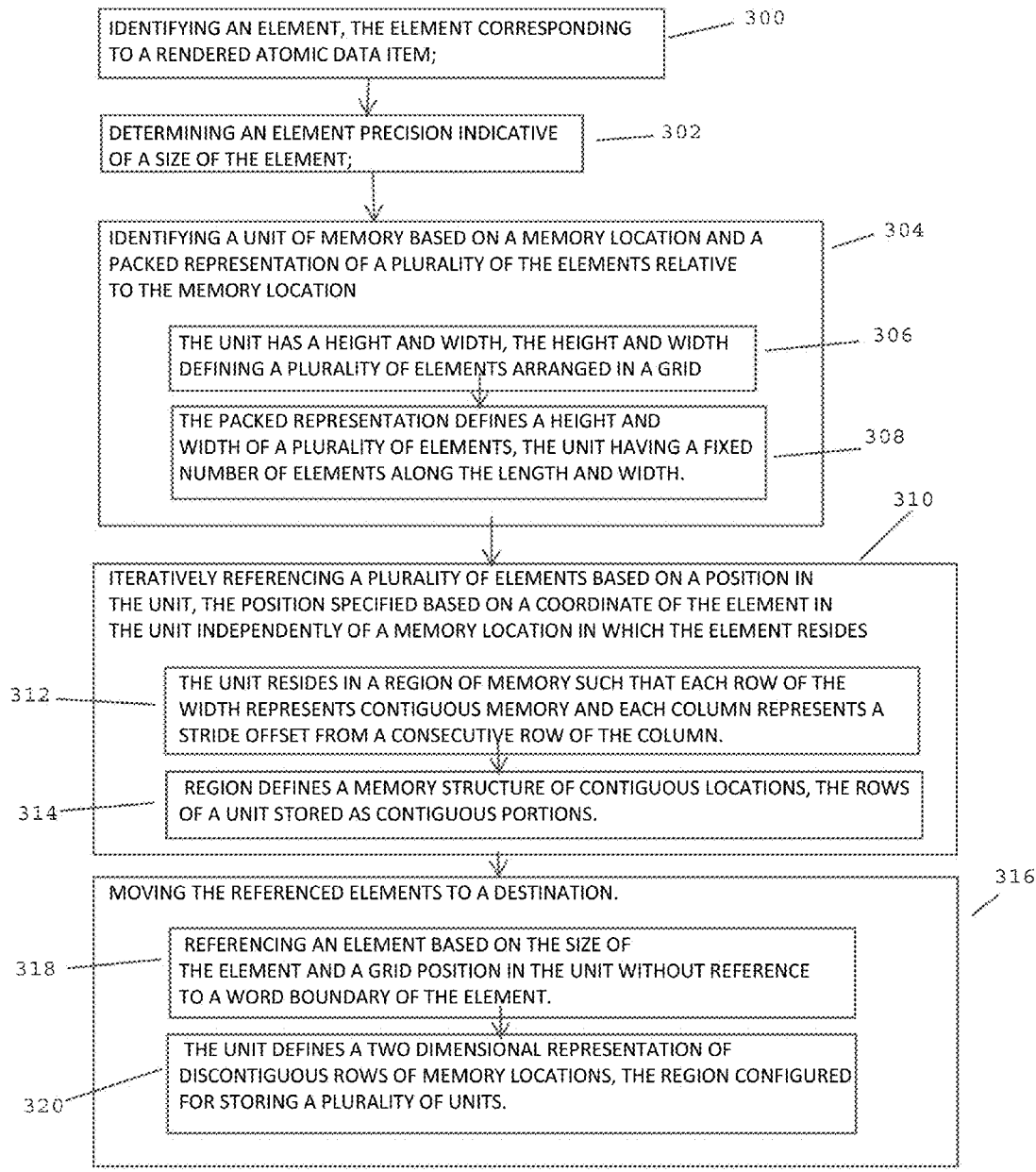
FIG. 3 is a flowchart of DMA access in the memory region of FIG. 2.

FIG. 3 is a flowchart of DMA access in the memory region of FIG. 2. Referring to FIGS. 1-3, the method of accessing memory as disclosed herein includes, at step 300, identifying an element 134 corresponding to a rendered atomic data item, such as a pixel. The DMA 130 determines an element precision indicative of a size of the element 134, specified in a number of bits per element, as depicted at step 302. Depending on the usage of the element data, the element bits may specify a particular color, hue and/or intensity level, for example. The number of bits may also be truncated or filed (buffered), as when moving data to a different resolution.

Based on a set of elements 134 representing a cohesive data item, such as a screen display or an on-screen visual object, the DMA 130 identifies a unit 140 of memory based on a memory location such as the origin 136 and a packed representation of a plurality of the elements 134 relative to the memory location, as shown at step 304, such as a row and column offset from the origin 136. In the examples shown, each of the units 140 has a height 144 and width 142, such that the height 144 and width 142 define a plurality of elements 134 arranged in a grid, as depicted at step 306. The packed representation defines a height and width of a plurality of elements 134, such that the unit 140 has a fixed number of elements 134 along the height and width, as disclosed at step 308. Unlike byte or word aligned data items, which must begin on a boundary between bytes or words despite unused bits in a previous byte, the packed representation stores a successive element in a successive bit from the preceding element 134.

In executing an operation, the DMA 130 iteratively references a plurality of elements 134 based on a position in the unit 140, such that the position is specified based on a coordinate of the element 134 in the unit 140 independently of a memory location in which the element resides, as depicted at step 310. In the example configuration, the unit resides 140 in a region 132 of memory such that each row 149 of the width 135 represents contiguous memory and each column 148 represents a stride 139 offset from a consecutive row of the column, as shown at step 312. The stride 139 represents where the region 132 "wraps" to a successive row, possibly denoting a visible screen area, for example. The region 132 therefore defines a memory structure of contiguous locations, in which the rows 149 of a unit stored as contiguous portions, as depicted at step 314. In a particular arrangement, each row is therefore a set of elements 134 packed together depending on the precision, and each successive row begins a stride 139 offset from the previous row, since the memory locations in the region 132 increase sequentially down and right from the origin 136. The rows 149 of the region 132 are therefore stored at contiguous locations. However, in particular configurations, successive rows 149 do not necessarily lie at contiguous locations in memory, i.e. dependent on the configured stride, unused memory locations may exist between consecutive rows.

The DMA 130 then moves the referenced elements 134 to the destination 146, as shown at step 316. This includes, at step 318, referencing each element 134 based on the size of the element 134 and a grid position in the unit 140 without reference to a word boundary of the element 134, since the elements do not necessarily begin on word boundaries. The unit 140 therefore defines a two dimensional representation of discontiguous rows of memory locations, in which the region 132 is configured for storing a plurality of units.

Therefore, in the example arrangement shown, each word contains a number of complete elements and is potentially "filled" with left-over/unused bits, to ensure each consecutive word begins at an element boundary. In alternate configurations, elements may be permitted to cross word boundaries, however the DMA controller 130 of FIGS. 8A and 8B may employ full bit-level barrel-shifters, in contrast to shifters that shift word in larger step sizes (the minimal supported element precision).

Figure 4:
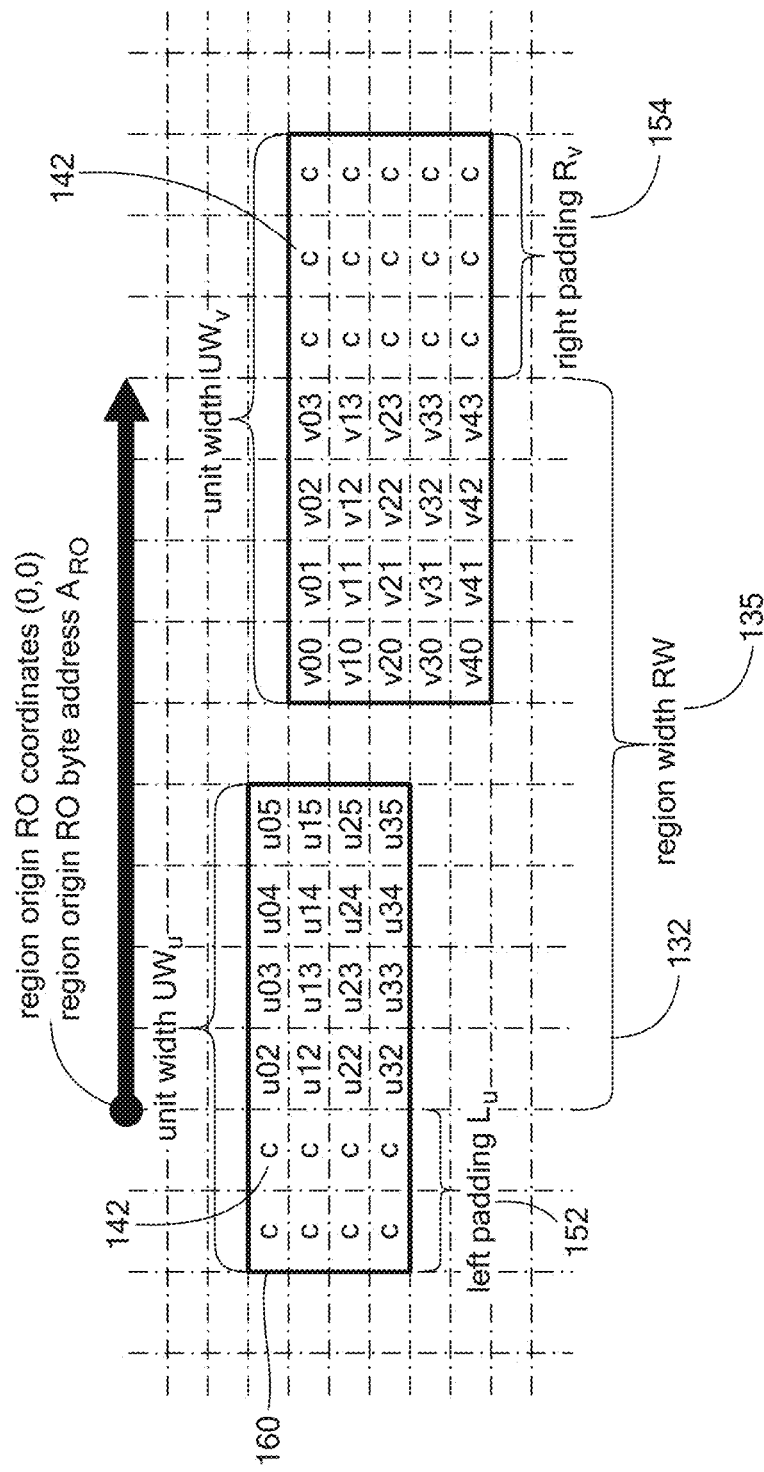
FIG. 4 is a diagram of padding the region in FIG. 2.

FIG. 4 is a diagram of padding the region in FIG. 2. Referring to FIGS. 1, 3 and 4, units 140 for which the location (origin 136) is coordinate-based may partly cross the borders of the region as defined along the horizontal axis between the region origin x-coordinate 0 and the x-coordinate (column) equal to the value of region width 135. In this case, elements 134 within such a unit, being transferred from a source with given region parameters, are treated in a special manner. This holds for those elements 134 of a unit that lie outside the specified region 132, such as the leftmost elements of unit 140-1 and the rightmost elements of unit 140-3.

For these elements 134 that lie outside the region, a padding approach is applied. Padding means that a writing master can optionally replace a number of elements L on the left side or a number of elements R on the right side of each row of elements within a given unit crossing region boundaries at the source. This mechanism is referred to as left-padding 152 or right-padding 154, respectively. Using this concept, whenever a unit 140 is moved by the DMA 130 from a certain source 116 to a certain destination 146, elements 134 within that unit 134 being read at the source 116 that lie outside the specified region 132 at that source, may be replaced or even removed when writing the unit to the destination 146. The DMA 130 therefore identifies a portion of the elements 134 outside the region 132, such that the region 132 is defined by an origin 136 designated by a grid position of an element 134, and augments the elements in the identified portion (152 or 154). Such padding may provide a border to a rendered screen object, or may provide placeholder values for sampling algorithms that invoke values within a certain element distance of a sampled element 134. Therefore, given that the origin 136 and width 135 defines the region 132, the elements 134 outside the region being either to the left or right, padding includes augmenting the elements on either the right or the left of the region.

Augmenting occurs in several different manners. In a 'constant' padding mode, the padded elements 134 (i.e. outside the region 132) for a given unit 140 use the same constant value c 160 that can be programmed in the DMA 130. Hence, effectively the L-padded 152 element columns to the left of each unit block row are replaced by value c 145 or the R-padded 154 element columns to the right of each unit row are replaced by value c. Therefore, augmenting the elements outside the region is performed by replacing a value of the augmented element with a constant.

Figure 5:
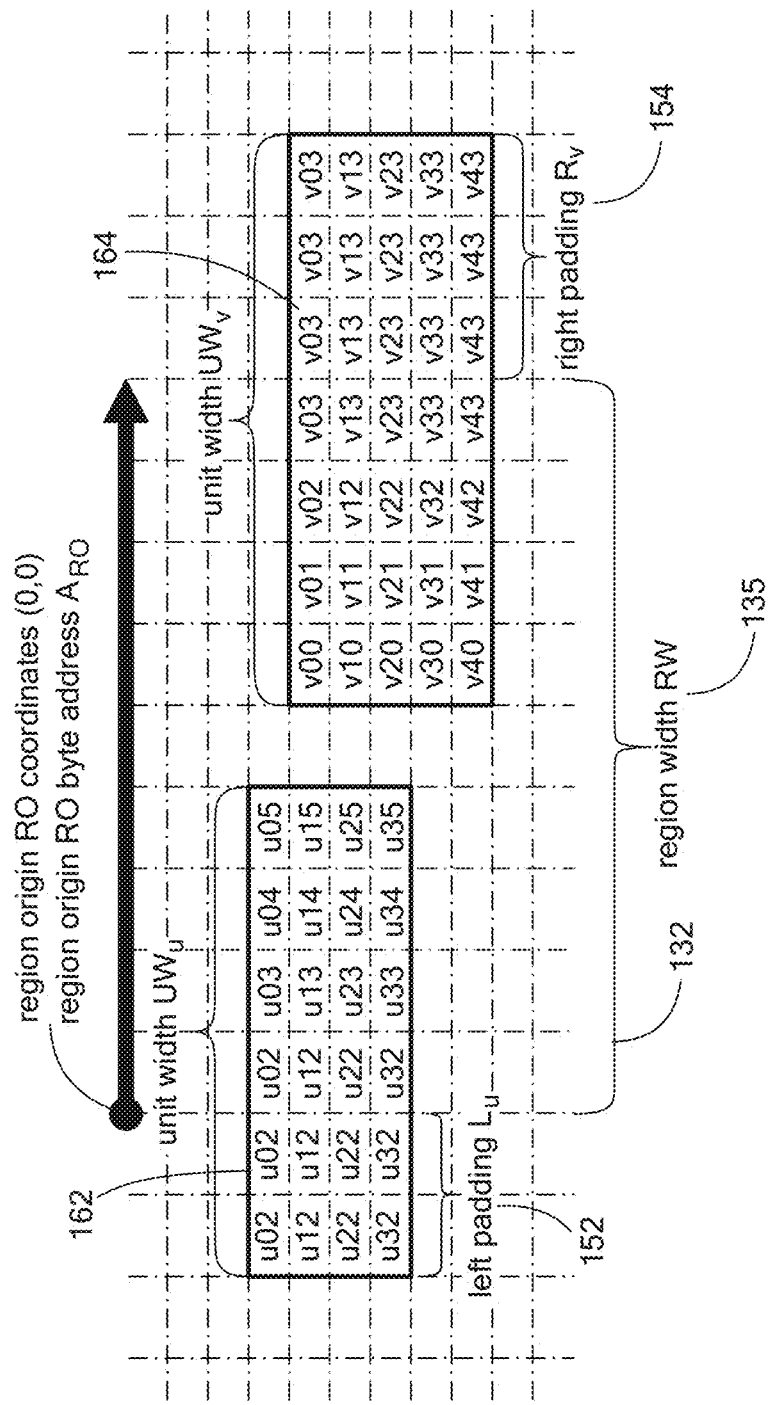
FIG. 5 is a diagram of an alternate padding arrangement of the region of FIG. 2.

FIG. 5 is a diagram of an alternate padding arrangement of the region of FIG. 2. Referring to FIGS. 1, 2 and 5, in 'clone' padding mode, the left-padded elements on each element line (row) within a given unit use the value 162 of the element located at the left region boundary on that element line. The right-padded elements on each element line (row) within a given unit use the value 164 of the element located at the right region boundary on that element line. Hence, effectively the elements on the region boundary are 'cloned' to replace the elements within the unit that lie outside the specified region. In this manner, the DMA 130 augments the elements 134 outside the region by replacing a value of the augmented element with the value 162, 164 of the element preceding the augmented element 134 in the row 149.

Figure 6:
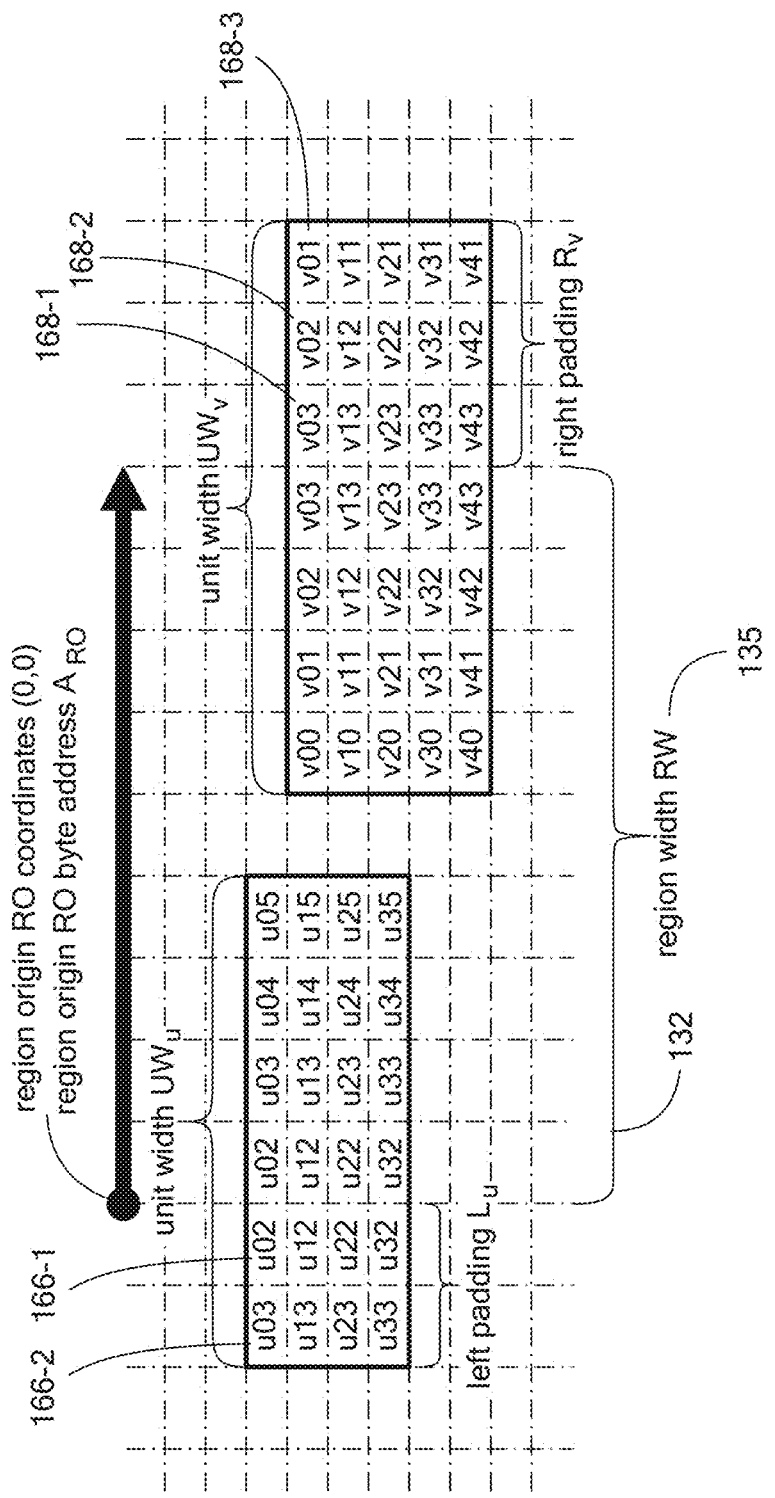
FIG. 6 is a diagram of a further padding arrangement of the region of FIG. 2.

FIG. 6 is a diagram of a further padding arrangement. Referring to FIGS. 1, 3 and 6, in a 'mirror' padding mode, the elements being padded left or right within a unit consist of the L leftmost (166-1, 166-2) and R right-most (168-1, 168-2, 168-3) elements 134 of the unit 140 in reversed (mirrored) order. The DMA augments the elements outside the region 132 by copying values from elements in corresponding positions within the region 132, such that the first outside position 166-1, 168-1 received the value of the leftmost or rightmost element, respectively. The second outside position 166-2, 168-2 receives the value of the second leftmost or second rightmost position, and so on.

Other padding modes include an 'append' mode and a 'truncate' mode. In 'append' padding mode, the elements 134 located outside the region are transferred unaltered, i.e. they are neither replaced nor ignored. As a result, the entire unit 140 is transferred as is. In 'truncate' padding mode, any elements 134 within a unit falling outside the region boundaries are not transferred, causing the unit to effectively be cropped at the region 132 boundary.

Figure 7:
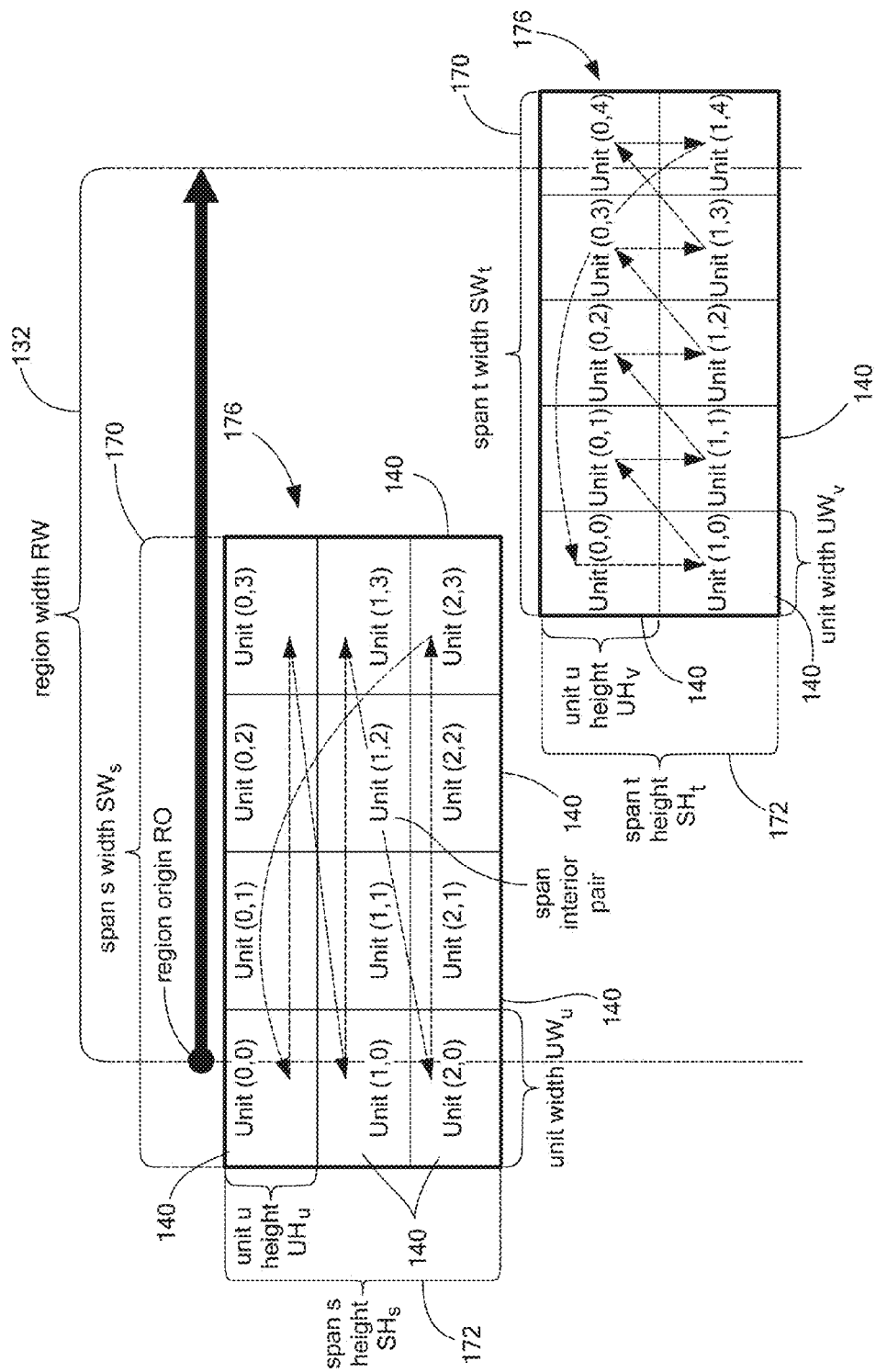
FIG. 7 is an operation on a plurality of units in the region of FIG. 2.

FIG. 7 is an operation on a plurality of units in the region of FIG. 2. The DMA 130 uses the concept of so-called spans to describe patterns of data transfers at the granularity of a unit. Using span iterators, the DMA controller 130 processes a plurality of units 140 according to a predetermined order, in effect imposing another grid system on the units 140. The units 140 are ordered as a span, defined by a span width 170 and span height 172. The span iterator traverses the units 140 in either row major 174 or column major 176 order. A span is characterized by the span width 170 and the span height 172, both defined in a number of units 140. Using these parameters the span defines how many units of the same dimensions, horizontally (along the width of the span) and vertically (along the height of the span), are moved along a specified transfer pattern. This transfer pattern is referred to as span order. A pattern starts at the top-left corner of the span and ends at the bottom right corner of the span, running along the units covered by the span in either row-first or column-first order. When the bottom-right corner of the span is reached, the pattern wraps around back to the top-left corner of the span. As shown in FIG. 7, spans of different dimensions and using different span orders may be defined across the same region 132. Moreover, FIG. 7 illustrates that the dimensions of the units covered by a given span are the same for each unit covered by the span. Different spans may cover units 140 of different dimensions.

FIGS. 8A and 8B are an architecture diagram of the DMA controller of FIG. 1. Referring to FIGS. 8A and 8B and 1, FIGS. 8A and 8B shows a high-level architecture of the DMA 130. A main data transfer pipe 180 of the DMA is formed by five building blocks, that is, two data masters 182-1, 182-2 (182 generally), two data queues 184-1, 184-2 (184 generally) and a packer 186. Dependent on the direction of a transfer, one master 182 is reading data from the source and buffering it the data queue 184 directly connected to it. The other master 182 is writing data to the destination that it is receiving from the data queue 184 directly connected to it. The packer 186 performs any required element precision conversion, data word width conversion including the packing of elements within those data words, as well as any required padding. The data transfer pipe 180 is controlled via a command distributor 188 which contains a five-head First-In-First-Out (FIFO) buffer 190 issuing commands in pipelined fashion to the five data transfer pipe blocks. Due to the five-head FIFO 190, each of these five building blocks can operate independently of each other where for instance the reading data master can run ahead of the writing data master by a couple of commands, dependent on the depth of the command queue and the latencies in the data transfer. The command distributor FIFO buffer 190 is filled from an operation decoder 192, which derives the required operation information (e.g. block width, block height, transfer kind, transfer direction, padding amounts, left margin, subsampling offset) from the unit, span, terminal and channel information (indirectly) specified via the instruction to which the operation belongs. Instructions are received from an instruction distributor 194, which contains a number of parallel instruction queues 196 across which a round robin operation arbiter in each cycle selects the next operation extracted from an instruction of one of the instruction queues 196 to be passed on to the operation decoder 192. The instruction queues 196 are fed from request registers 198. The request registers are organized in separate banks. Through the control slave interface 200, separate (parallel) instructions can be programmed in each of the request banks. Typically, each requester using the DMA will use a separate request bank in order not to intervene with requests being programmed by other requesters. Each request bank is associated with a dedicated instruction queue in the instruction distributor. Unit, span, terminal and channel register groups 202-1 . . . 202-4, respectively) contain the required span descriptor, channel descriptor and terminal descriptor configuration information for each instruction. For this purpose, these register groups are also organized in banks such that multiple configurations can be alive at a given moment in time to serve different instructions in flight on the DMA 130. Before an instruction can be executed this configuration information must be available. It can either be pre-programmed via the control slave interface 200, or it can be automatically fetched through a control master interface 204 under cache control. Additional global configuration information can be pre-programmed by the user through the control slave interface 200 in global registers and master registers. Next to control information that can be programmed in the registers described above, the channel and global registers also contain status information that can be observed by the user. This includes instruction execution acknowledgement information as well as error information.

The above configurations provide a system and method for manipulating varying precision data efficiently in memory, in particular memory devoted to video data for image capturing and rendering. The disclosed approach of coordinate based, rather than word based, addressing has particular advantages for operations such as sampling and referencing large spans of memory. Certain signal processing algorithms make use of subsampling of elements while processing. An example of this is motion estimation, wherein blocks of decimated pixels taken from an image are used to estimate motion. Another application area is extraction of specific component pixel data from interleaved pixel data, such as extracting luma (brightness) information (Y component) from YUV (color image) interleaved pixel formats.

In contrast to conventional approaches that perform the decimation (i.e. extraction) during processing, it is beneficial to have DMA transfer only the relevant (decimated) elements to the processing engine. This simplifies the processing algorithm and storage overhead, which in turn reduces the complexity and cost of the processing engine, which may either be implemented as hardware or firmware.

Configurations described above may be employed to implement a solution for adding subsampling/decimation support to a DMA. It also enables subsampling/decimation in a way which minimizes DMA programming control complexity and/or overhead by building subsampling support on top of the coordinate-based addressing and padding operations discussed above.

Referring again to FIGS. 1 and 2, the location of a block of data elements 134 (unit 140) to be moved or initialized by the DMA is expressed (and programmed) by an (x,y)-coordinate pair that specifies the position of the unit 140 within the two-dimensional space define as the region 132, relative to the origin (coordinates (0,0)) of that region 132. The boundaries of a region 132 are specified indirectly by specifying the width of region in number of elements 134. The width 142 of unit is expressed in number of elements as well.

The x-coordinate of an element indirectly specifies an element offset into each data word being read or written by the DMA. A subsampling factor f is provided to the DMA 130 which effectively is a multiplier for the number of elements to be read by the DMA on each horizontal unit line and hence indirectly determines the number of elements 134 being skipped while packing elements from read data words into words to be written by the DMA 130. A subsampling offset o with 0<o<f determines the element offset within each data word from which the first relevant subsampled element 134 is read.

Based on (x,y) coordinates of elements 134, a region width, a padding mode specification, and a configured subsampling factor, the DMA can automatically compute the subsampling offset within each word and perform the right element decimation during packing of read subsampled elements 134 into words to be written by the DMA.

Certain traditional memory controllers perform programming of pixel block transfers at the level of bytes. Given that pixel precisions are typically not a clean (power of 2) byte multiples, but can have arbitrary precision (e.g. 8, 10, 12, 14 bit) precision, to program a DMA to move or initialize a pixel block, complex address calculations are required in firmware/software. To support this DMA control, typical platforms include a complex DMA proxy, implemented in FW (firmware) on a control processor, which consumes about 10% of the control processor compute capabilities controlling a single DMA moving data to and from a single vector digital signal processor core to run a single 1080p video capture stream. Other conventional controllers may support subsampling but only with strict (power of 2 in bytes) precision and requiring explicit calculation and specification of subsampling offset by the user. Calculation of subsampling offset becomes increasingly complex when having to deal with arbitrary precision.

For example, on a typical platform, about 10 separate DMA instances must be controlled to move data to and from 4 parallel digital signal processor cores, a shared global memory and fixed function pipes, while processing up to 4 parallel streams and up to 4k60 video with still-capture during video.

In a proposed implementation, subsampling may be constrained to using specific subsampling factors which must be powers of 2, i.e. allowed subsampling factors are 1, 2, 4, 8, 16, etc. However, as a generalization of this concept, any integer subsampling factor could be supported, although non-power of 2 factors will be more expensive to implement in hardware. A constraint on subsampling is that the combination of configured subsampling factor and element precision cannot exceed the data port width of the reading master. In other words, with configured subsampling factor f, configured precision Pr, and reading master data port width Dr, the following condition is generally observed: f*Pr<=Dr While subsampling with a factor f larger than 1, a reading master will read elements located at positions within the region at the source, specifically spaced in accordance with the subsampling factor to construct each unit element line. Hence, to move a unit of data with a unit width UW the reading master will effectively fetch f*UW elements per unit line. Out of these fetched elements it will pass on UW decimated elements to the writing master and discard the remaining (f−1)*UW elements.

In an implementation with subsampling factor f effectively the original element-based grid across a unit becomes an f times coarser grid along the horizontal axis. When subsampling is applied on units crossing a region 132 boundary and mirror padding mode (discussed above) is used, this subsampling grid is actually mirrored at the region boundary as well, to ensure the mirrored elements properly represent copies of the original subsampled elements located within the region boundary To further reduce programming overhead, the regularity in data access that is typical in image processing can be used by pre-configuring an access pattern that the DMA can follow when transferring consecutive units of the same size from the source to the destination. Using this pattern information, the DMA 130 is capable of automatically computing the source 116 and destination 146 locations of the next unit 140 to be transferred. Configurations of the disclosed approach specify and control the actions by which the DMA 130 follows such access patterns by means of so-called spans and macros. Such an approach, discussed further below, is transparent to the support for automatic padding for units that cross region boundaries and for subsampling A span is a two-dimensional space characterized by a span width and span height expressed in number of units 140, covering units of given unit width and unit height expressed in number of elements, as described above. Associated with a span is a span-order, defined as either row-first or column-first. The span together with its span order defines the order in which units covered by the span are transferred by the DMA. Span and span order may be defined differently for source 116 and destination 146. The DMA 130 maintains state in terms of the last unit 140 being transferred as covered by the span. Thanks to maintaining this state, a user can provide different commands to the DMA each of which specifies moving a limited number of units covered by the span, while each next command can proceed within the span where the last command left of. This provides a very simple interface where a programmer can gradually transfer an entire frame of pixel data in "chunks" (including one or more units 140, and called macros) with synchronization points in between, by only providing the start address of the first unit 140 transferred as part of the span and without having to program new configuration information (e.g. start addresses and other parameters) for each consecutive command. Note, that this systematic approach avoids random access patterns that can be achieved with common scatter gather approaches, but at the same time it is much simpler and has far less overhead in programming regular access patterns. In general the proposed approach lends itself well to imaging.

In designating operations concerning a span, the relevant configuration information for a span is encoded in a so called span descriptor. This includes the span width, span height, and span order required for the transfer. Furthermore, the information contains a span iterator pair (column, row) for the unit currently being operated on by the instruction. Also, relative to the region origin, it defines the location for the unit currently being operated on by the instruction.

The span descriptors may operate in terms of macros. A macro defines a series of consecutive units positioned along a transfer pattern as defined by the dimensions and the transfer pattern order (row-first or column-first) of a given span. A macro is characterized by a so-called macro size MS, specifying the number of units that is part of the series of consecutive units defined by the macro.

Typically, all macros defined along a given span together cover the entire span. As the figure suggests, a macro may start at a given unit anywhere along the span. Moreover, a macro may wrap-around across the span from the bottom-right unit covered by the span to the top-left unit covered by the span.

Note, that the macro size may be larger than the number of units covered by a given span. This feature can be useful when a span with both width and height equal to 1 is used to access a FIFO buffer using 'fixed' port mode. For instance, in this situation data may be read from a source span with larger dimensions (i.e. covering multiple units) and written to the FIFO using a destination span with minimal dimensions (i.e. covering only one unit), using a macro size larger than 1 unit.

The concept of an instruction provides the user with basic control on how the DMA should transfer data from source to destination. Instructions operate at the level of macros as described above. As such, an instruction is associated with a macro size and one or two span identifiers (span ID for short). As explained earlier, the macro size defines how many units are transferred as part of the instruction along the span(s). Moreover, through the span IDs, specific span descriptors for source and destination are referenced by the instruction. The span descriptors provide the relevant span configuration information to the instruction.

During execution, an instruction is decoded into a series of operations (equal in number to the macro size), each of which operates on a corresponding unit 140 covered by the referenced span in the span order as specified. The span descriptor maintains state in the form of the unit 140 location and the span (column, row) iterator pair. By maintaining and updating this state while executing instructions, an entire span can be covered by multiple instructions. As such, each consecutive instruction can continue with unit transfer in the span, from where the previous instruction left off. Moreover, state is maintained between consecutive operations within a given instruction, such that the span descriptor at any given moment in time always reflects the location and span iterator pair information corresponding to the unit 140 currently being operated on Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of accessing memory, comprising:
    identifying an element, the element corresponding to a rendered atomic data item;
    determining an element precision indicative of a size of the element;
    identifying a unit of memory based on a memory location and a packed representation of a plurality of the elements relative to the memory location, the unit of memory resides in a region of memory such that each row of the width represents contiguous memory and each column represents a stride offset from a consecutive row of the column;
    iteratively referencing a plurality of elements based on a position in the unit of memory, the position specified based on a coordinate of the element in the unit of memory independently of a memory location in which the element resides;
    moving the referenced elements to a destination;
    identifying a portion of the elements outside the region, the region defined by an origin designated by a grid position of an element; and
    augmenting the elements in the identified portion.

2. The method of claim 1 wherein the unit of memory has a height and width, the height and width defining a plurality of elements arranged in a grid.

3. The method of claim 1 wherein the packed representation defines a height and width of a plurality of elements, the unit of memory having a fixed number of elements along the height and width.

4. The method of claim 1 further comprising iteratively referencing an element based on the size of the element and a grid position in the unit of memory without reference to a word boundary of the element.

5. The method of claim 1 further comprising augmenting the elements outside the region by replacing a value of the augmented element with a constant.

6. The method of claim 1 further comprising augmenting the elements outside the region by replacing a value of the augmented element with the value of the element preceding the augmented element.

7. The method of claim 1 further comprising augmenting the elements outside the region by copying values from elements in corresponding positions within the region.

8. The method of claim 1 wherein an origin and a width defines the region, the elements outside the region being either to the left or right, further comprising augmenting the elements on either the right or the left of the region.

9. The method of claim 1 wherein the destination comprises a rendering device for displaying the unit of memory on a pixelated form, the destination retaining the height and width of the unit of memory.

10. The method of claim 9 wherein the rendering device comprises a video display/capture buffer.

11. The method of claim 1 wherein the precision of the element is different than a word size of a memory storing the unit of memory.

12. The method of claim 1 wherein the packed representation preserves an ordering of element values in a work by shifting bits adjacent to a preceding element stored in a same word.

13. A direct memory access (DMA) controller, comprising:
    a plurality of elements, each element corresponding to a rendered atomic data item, each element having an element precision indicative of a size of the element;
    a unit of memory, the unit of memory based on a memory location and a packed representation of a plurality of the elements relative to the memory location;
    the unit of memory having a height and width defined by coordinates for iteratively referencing a plurality of elements based on a position in the unit of memory, the position specified based on a coordinate of the element in the unit of memory independently of a memory location in which the element resides;
    at least one instruction for moving the referenced elements to a destination, the instruction configured for referencing an element when the precision of the element is different than a word size of a memory storing the unit of memory; and
    a command distributor configured to:
        identify a portion of the elements outside a region, the region defined by an origin designated by a grid position of an element; and
        augment the elements in the identified portion.

14. The DMA controller of claim 13 wherein the packed representation defines a height and width of a plurality of elements arranged in a grid, the unit of memory having a fixed number of elements along the height and width.

15. The DMA controller of claim 14 wherein the unit of memory is configured for referencing an element based on the size of the element and a grid position in the unit of memory without reference to a word boundary of the element.

16. The DMA controller of claim 13 wherein the destination comprises a rendering device for displaying the unit of memory on a pixelated form, the destination retaining the height and width of the unit of memory.

17. The method of claim 16 wherein the rendering device comprises a video display/capture buffer.

18. A computer program product having instructions encoded on a non-transitory computer readable storage medium that, when executed by a system, cause the system to:
- identify an element, the element corresponding to a rendered atomic data item;
- determine an element precision indicative of a size of the element;
- identify a unit of memory based on a memory location and a packed representation of a plurality of the elements relative to the memory location, the unit of memory resides in a region of memory such that each row of the width represents contiguous memory and each column represents a stride offset from a consecutive row of the column;
- iteratively reference a plurality of elements based on a position in the unit of memory, the position specified based on a coordinate of the element in the unit of memory independently of a memory location in which the element resides;
- move the referenced elements to a destination;
- identify a portion of the elements outside the region, the region defined by an origin designated by a grid position of an element; and
- augment the elements in the identified portion.

19. The computer program product of claim 18 wherein the destination comprises a rendering device for displaying the unit of memory on a pixelated form, the destination retaining the height and width of the unit of memory.

20. The computer program product of claim 19 wherein the rendering device comprises a video display/capture buffer.

* * * * *